Feb. 28, 1933.   W. E. KROTEE   1,899,159
INSULATED DRIVING CONNECTION
Filed Sept. 27, 1929   2 Sheets-Sheet 1

Inventor
Walter E. Krotee
By W. N. Roach
Attorney

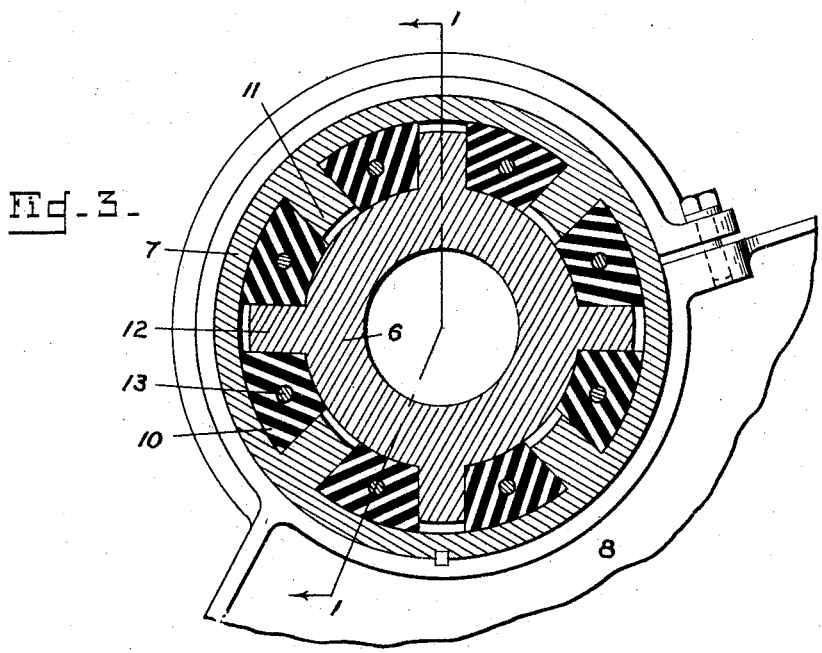
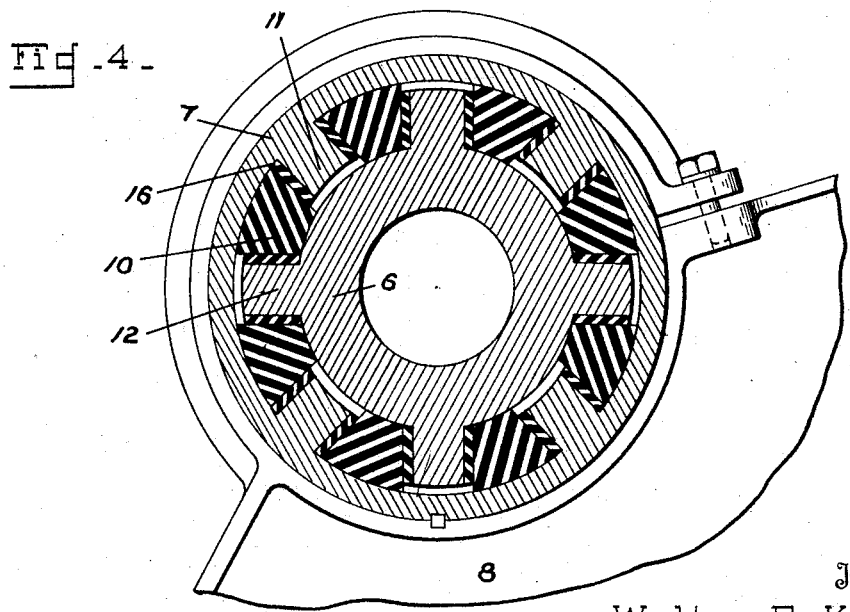

Patented Feb. 28, 1933

1,899,159

UNITED STATES PATENT OFFICE

WALTER E. KROTEE, OF PHILADELPHIA, PENNSYLVANIA

INSULATED DRIVING CONNECTION

Application filed September 27, 1929. Serial No. 395,662.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to an insulated driving connection especially adapted for acoustic members.

The object of this invention is to provide a novel arrangement of an insulating driving connection in which the insulation is readily assembled and adjusted.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 3 is a sectional view on the line 3—3 of Fig. 1;

Fig. 4 is a view similar to Fig. 3, showing a modification of the insulating members.

Figure 1:
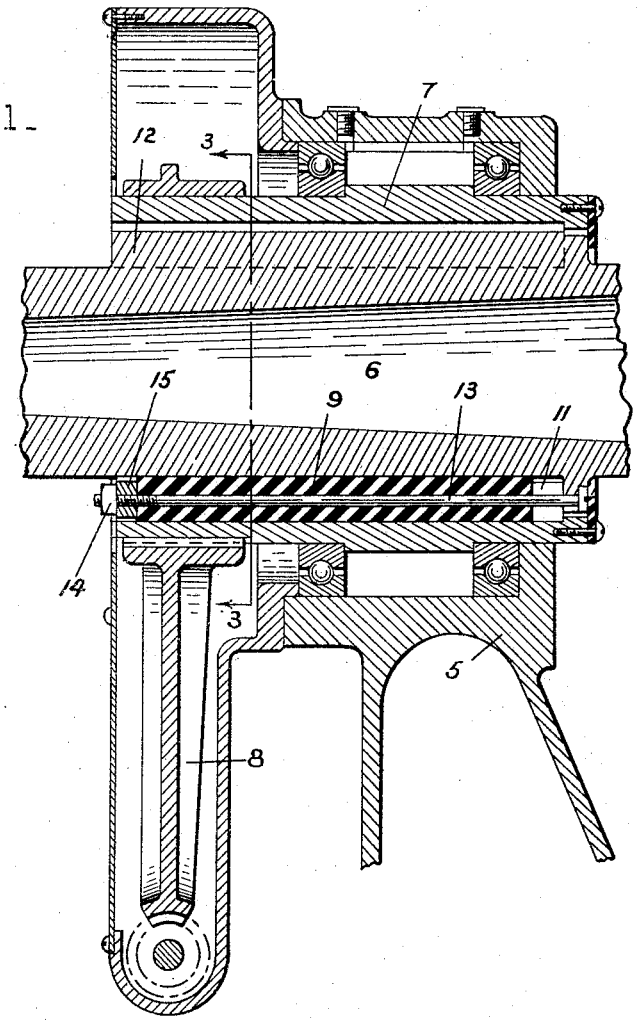
Fig. 1 is a longitudinal sectional view on the line 1—1 of Fig. 3 of a bearing showing the improved insulated driving connection.
Figure 2:
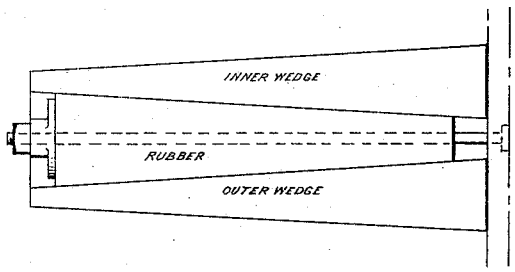
Fig. 2 is a diagrammatic plan view.

Referring to the drawings by numerals of reference:

There is shown a support 5 for mounting a member 6 which is to be driven through a sleeve 7 having a gear segment 8. The driven member 6 is inserted through the sleeve and is supported thereby through a bushing 9 of an insulating material.

For the purpose of establishing a driving connection between the member 6 and the sleeve, the bushing is made in sections 10—10 which are placed between alternately disposed longitudinally extending fins 11 and 12 formed respectively on the inner wall of the sleeve and on the outer wall of the driven member 6. The spaced fins are formed to establish a wedge-way and the sections 10 of the insulation are correspondingly wedge-shaped in the direction of their length.

The sections 10 are each mounted on a bolt 13 anchored either in the sleeve 7 or driven member 6, the latter being preferred, and are moved axially in the wedge-way by means of a nut 14 threaded on the bolt and acting on a bearing plate 15 which engages the end face of the insulating section.

In order to diminish shrinkage and facilitate assembly and sliding movement of the sections 10, they are wholly or partially cased in insulation 16 of a more rigid nature. For example, the sections 10 may consist of soft rubber vulcanized to the hard rubber casing members 16.

A driving connection formed in this manner can be easily maintained in proper adjustment and will effectively damp out any sound vibrations which arise from metallic actuating parts in the driving mechanism.

I claim:

1. A bearing including a support, a sleeve mounted in the support and provided internally with longitudinally extending fins, a driven member within the sleeve provided externally with longitudinally extending fins, the fins on the sleeve and driven member being alternately disposed and forming a wedge-way, a wedge of sound-damping material between adjacent fins, a rod anchored in the driven member and passing lengthwise through the wedge, means on the rod for translating the wedge, and means for driving the sleeve.

2. In a driving connection, a support, a driving member mounted on the support, a driven member within the driving member and spaced therefrom, means on adjacent walls of the members cooperating to form longitudinal wedge-ways, a sound-damping member wedge-shaped in the direction of its length and movably mounted in each wedge-way, said member consisting of resilient material with a casing of more rigid material.

3. In a driving connection, a support, a driving member mounted on the support, a driven member within the driving member and spaced therefrom, means on adjacent walls of the members cooperating to form longitudinal wedge-ways, and a sound-damping member wedge-shaped in the direction of its length and movably mounted in each wedge-way.

WALTER E. KROTEE.